US006349667B1

(12) United States Patent
Rogers et al.

(10) Patent No.: US 6,349,667 B1
(45) Date of Patent: Feb. 26, 2002

(54) LOCATION MARKER

(76) Inventors: Richard J. Rogers, 7540 E. Harbor Dr., Tucson, AZ (US) 85715; Bradley F. Rogers, 4932 E. Ventana Ridge Pl., Tucson, AZ (US) 85750

( * ) Notice: Subject to any disclaimer, the term of this patent is extended or adjusted under 35 U.S.C. 154(b) by 0 days.

(21) Appl. No.: 09/407,651

(22) Filed: Sep. 28, 1999

(51) Int. Cl.[7] .............................. E01F 9/19; G09F 17/00
(52) U.S. Cl. ..................... 116/209; 116/173; 116/63 L; 116/63 P
(58) Field of Search ................................. 116/209, 173, 116/63 C, 28 R, 63 P, 63 R; 248/512, 513; 40/591, 592, 600, 606, 607, 612, 618; 404/6, 9, 10, 12, 14

(56) References Cited

U.S. PATENT DOCUMENTS

| | | | | |
|---|---|---|---|---|
| 232,461 A | * | 9/1880 | Coolbaugh | 116/173 |
| 3,192,889 A | * | 7/1965 | Crudgington | 116/63 C |
| 3,905,324 A | * | 9/1975 | English | 116/63 P |
| 4,019,271 A | * | 4/1977 | Latimer | 116/63 P |
| 4,269,534 A | * | 5/1981 | Ryan | 40/607 |
| 4,275,535 A | * | 6/1981 | Stalzer | 116/209 |
| 4,645,168 A | * | 2/1987 | Beard | 404/10 |
| 4,799,448 A | * | 1/1989 | Junker | 116/63 P |
| 4,910,902 A | * | 3/1990 | Anderson | 40/607 |
| 5,044,200 A | * | 9/1991 | Dailey et al. | 40/607 |
| 5,089,803 A | * | 2/1992 | Bohn | 116/28 R |
| 5,269,251 A | * | 12/1993 | Freeman | 116/63 C |
| 5,375,554 A | * | 12/1994 | Yen | 116/63 P |
| 5,377,944 A | * | 1/1995 | Getsinger | 248/512 |
| 5,483,917 A | * | 1/1996 | Walker | 116/63 P |
| 5,888,016 A | * | 3/1999 | Ahn | 116/63 C |

* cited by examiner

Primary Examiner—Andrew H. Hirshfeld
(74) Attorney, Agent, or Firm—Gregory J. Nelson

(57) ABSTRACT

A location marker having an upwardly converging body having one or more receptacles at the upper end which are configured to removably support chemical luminescent flares, flags or other warning devices. The device may be used by motorists, at crime scenes or even as boundary markers for sporting events.

7 Claims, 3 Drawing Sheets

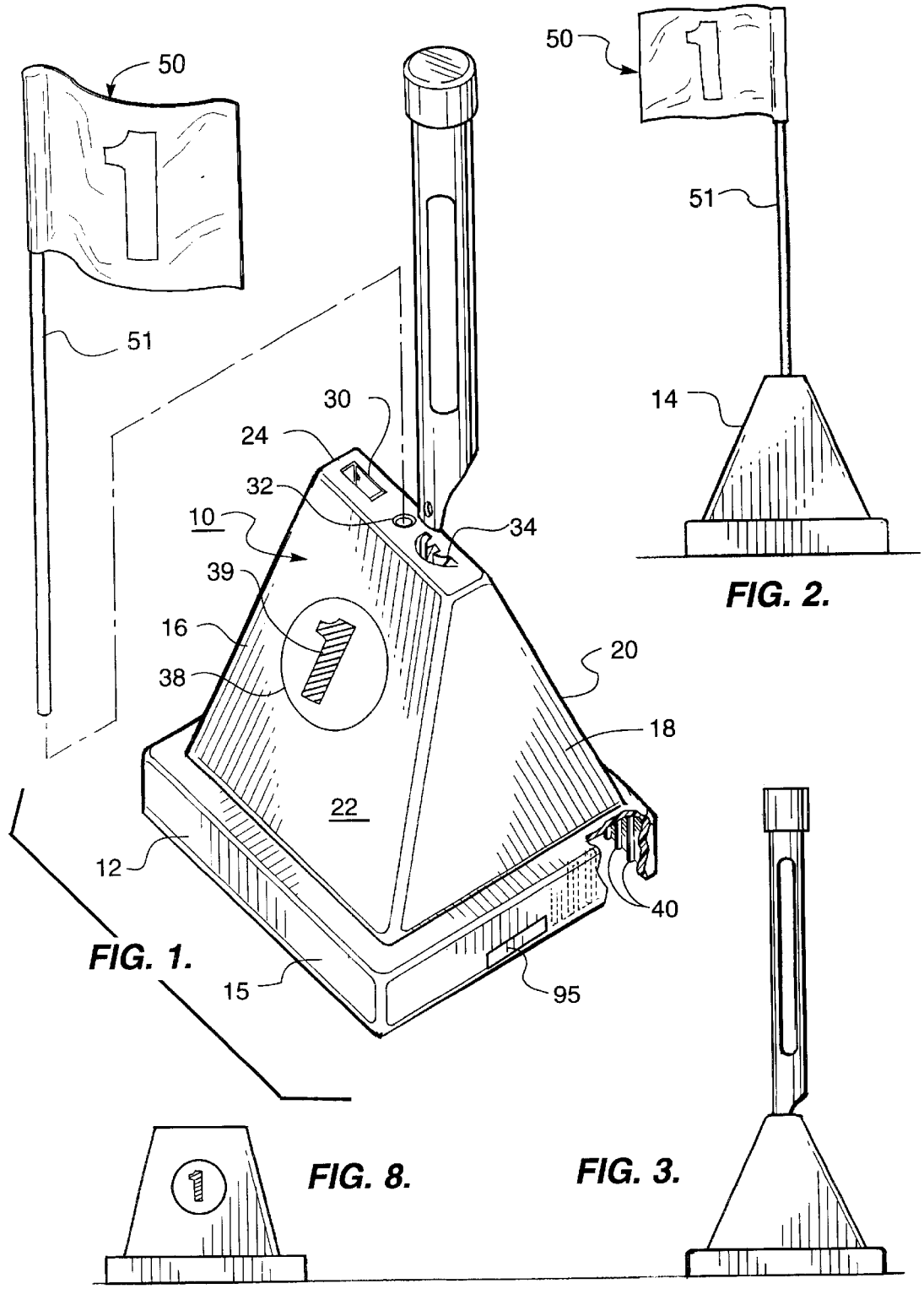

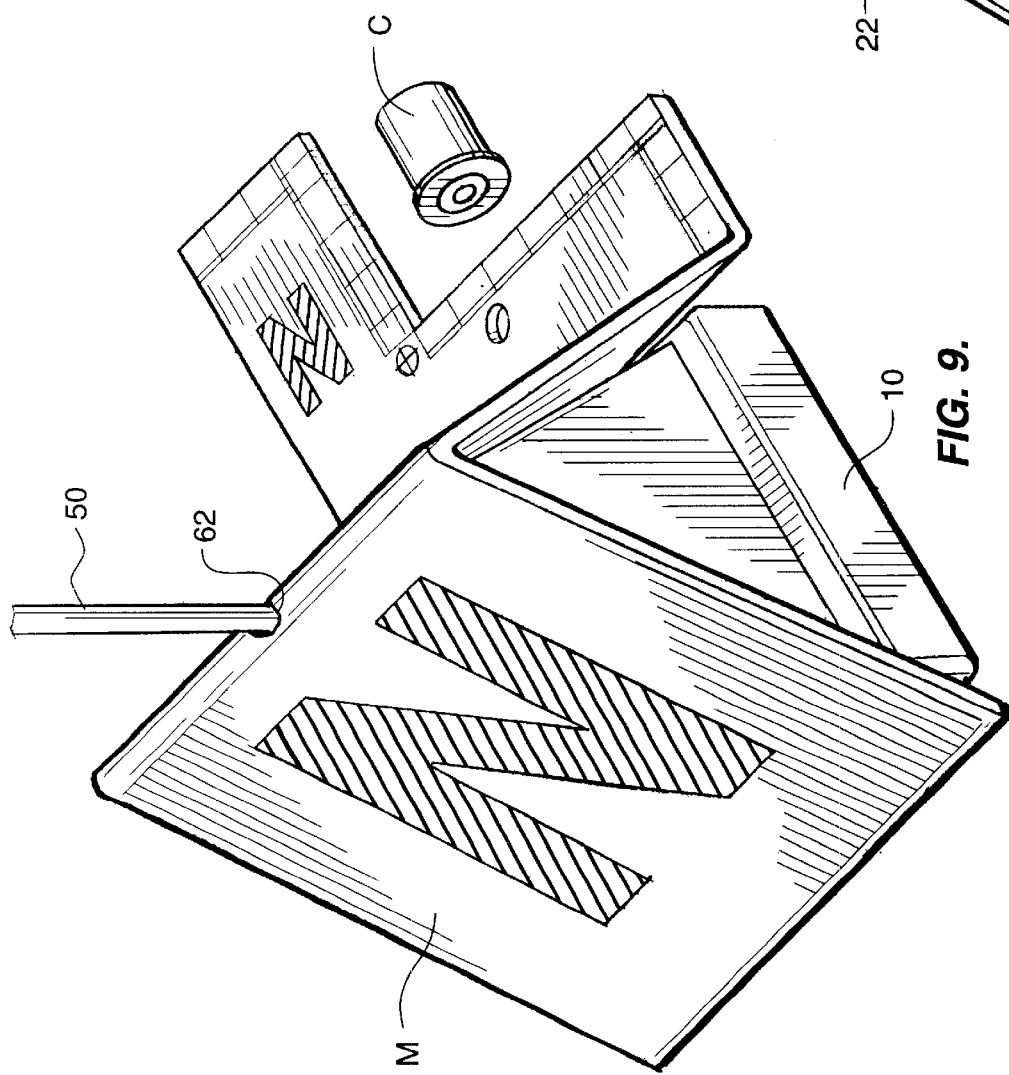
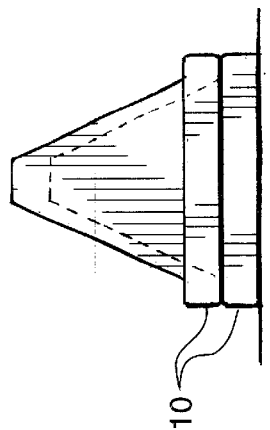
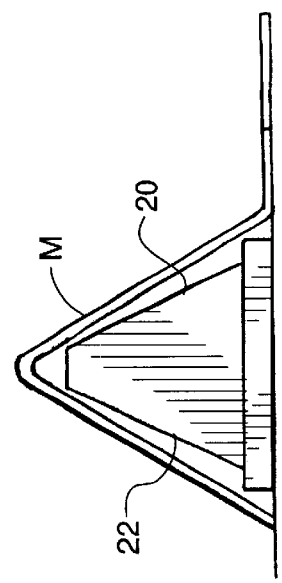

LOCATION MARKER

FIELD OF THE INVENTION

The present invention relates to a marker and more particularly relates to a location marker which is freestanding and may be used alone or with additional warning or cautionary devices at crime scenes, sporting events or as a traffic control or warning device.

BACKGROUND OF THE INVENTION

Freestanding marker devices are used in connection with various activities and situations. For example, at sporting events, particularly those such as little league activities, playing field boundaries are often marked with devices such as conventional traffic cones which are normally used to temporarily mark traffic lanes and restrictions. Conventional traffic cones due to their size are often unwieldy, difficult to store in a location such as the trunk of a vehicle and are expensive.

Markers are also used in emergency situations. Motorists often carry markers such as reflectorized panels or flares in the event of a mechanical problem or if a flat tire occurs. Safe practice dictates that the motorist place markers a prescribed distance on either side of the vehicle to warn traffic of a disabled vehicle.

Another situation in which markers are utilized is in connection with identifying evidence at a crime scene by law enforcement investigators or forensic personnel. The proper handling and identification of crime scene evidence is extremely important both to the investigative procedures and to provide the foundation for subsequent admissibility of evidence at trial. Accordingly, recently markers for use at crime scenes and as evidence ID markers have been developed and one such marker is the subject of U.S. Pat. No. 5,787,616 entitled "Evidence Marker". This patent shows a marker for placement adjacent an evidence item at a crime scene which marker has upstanding panels connected to form a freestanding unit. A base panel extends from the lower edge of one of the upstanding panels and is imprinted with reference indicia such as suitable reference scales and a photographic target. The surfaces of the panels are imprinted with indicia such as numerals or letters. Markers as shown in the '616 patent are provided for use by individuals such as law enforcement personnel in kits containing multiple sequentially imprinted markers.

Other freestanding markers or signs can be found in the prior art and the following are representative of these.

U.S. Pat. No. 1,943,295 shows a three-legged advertising frame and paper weight made from metal stock. The surfaces of the three projecting faces are provided with desired lettering or advertising.

U.S. Pat. No. 4,182,063 discloses a foldable sign for a motorist which may be collapsed in accordion fashion and which may be unfolded to display the desired message.

U.S. Pat. No. 4,270,291 discloses a sign construction which has a panel securable to a window. Message bearing panels are hinged to the upper panel to allow the user to select and display the appropriate sign.

U.S. Pat. No. 4,541,190 shows a foldable, collapsible traffic display sign. The device has three rectangular panels which are connected by two folding hinges. Each of the display carries an appropriate warning such as the word HELP, STOP or the like.

U.S. Pat. No. 4,977,697 shows a traffic barrier which is a unitary panel having a plurality of folds to permit the device to be placed in an A-frame configuration displaying appropriate message panels.

U.S. Pat. No. 5,056,520 shows a self-standing placard which has a message on its front surface. A curved fastener on the back of the placard cooperates with a stiff spacing member to support the placard.

U.S. Pat. No. 4,173,086 shows a sign structure which includes a pole member and means for mounting the pole in an upright position. A sign panel is mounted on the upper portion of the pole. The sign panel is removable.

U.S. Pat. No. 3,371,647 shows an athletic field marker for football fields and the like comprising a plastic, pliable, flexible post of foam rubber like material such as polyethylene foam having an impervious cover such as vinyl. A rubber base plate is bonded to the lower end of the post and has a plug insertable in a socket in the ground.

U.S. Pat. No. 5,269,251 shows a traffic control system which is useable with signs, flags, rope, tape and light sticks. The patent discloses adapters which attach to the top of a standard cone and may be employed to secure the information sign to the adapter and cone.

Thus, the prior art includes various markers, signs or flag devices which are for display. Generally, with the exception of the evidence marker shown in the '616 patent, these devices require some sort of special mounting, must be erected, unfolded or assembled at the time of display and generally are limited to a specific application such as a field marker or for displaying a sign.

BRIEF DESCRIPTION OF THE INVENTION

Briefly, the present invention provides a marker which is a freestanding integral unit having a base which supports an upwardly converging body. The body may be in the form of a truncated pyramid or cone having an upper end. The upper end has one or more receptacles which receptacles define openings of various shapes such as circular, arcuate, rectangular or the like. The openings are spaced apart so that various types of markers or warning devices may be inserted into the openings and supported in a display position. For example, the circular opening may receive the staff or pole of a small flag. The arcuate and rectangular openings are configured so as to receive the tab extending from the base of flares such as chemical luminescent flares such as those manufactured by American Cyanamid Company and sold under the trademark Cyalume® Light Stick. Preferably, the marker is molded as an integral structure from a suitable durable plastic material. The markers are compact and similarly configured so that they may be nestably stacked for convenient storage.

The body of the marker provides a display surface on which identification indicia such as a letter or numeral may be applied. Also, a reflectorized patch of material such as that sold by 3-M under the trademark SCOTCH LITE® or that sold by Reflexite Corporation under the trademark Reflexite® may be applied for increased visibility and enhanced photographability at a location such as a crime scene. A clip may be attached to the display surface for attachment of a note or card. The base may include one or more magnets so that the marker may be secured to a metal surface such as the roof or hood of a vehicle.

In the preferred embodiment, the body of the marker of the present invention is in the form of a truncated pyramid so that the marker can be used in conjunction with crime scene evidence markers such as those described in U.S. Pat. No. 5,787,616. The evidence marker of the '616 patent can be positioned over the body of the marker of the present invention for added resistance to inadvertent dislocation.

BRIEF DESCRIPTION OF THE DRAWINGS

The above and other objects and advantages of the present invention will be more fully understood and appreciated from the following description, claims and drawings in which:

FIG. 1 is a perspective view of the marker of the present invention shown used in conjunction with a flag and a light stick;

FIG. 2 is a side view showing the marker supporting a flag;

FIG. 3 is a side view showing the marker supporting a flare;

FIG. 8 is a side view of another embodiment of the marker having a conical body;

FIG. 9 is a perspective view showing the marker of the present invention used in conjunction with an evidence marker of the type shown and described in U.S. Pat. No. 5,787,616;

FIG. 10 is a side view of the marker and an evidence marker as shown in FIG. 9; and FIG. 11 shows several markers in a stacked, nested position.

DETAILED DESCRIPTION OF THE DRAWINGS

Figure 5:
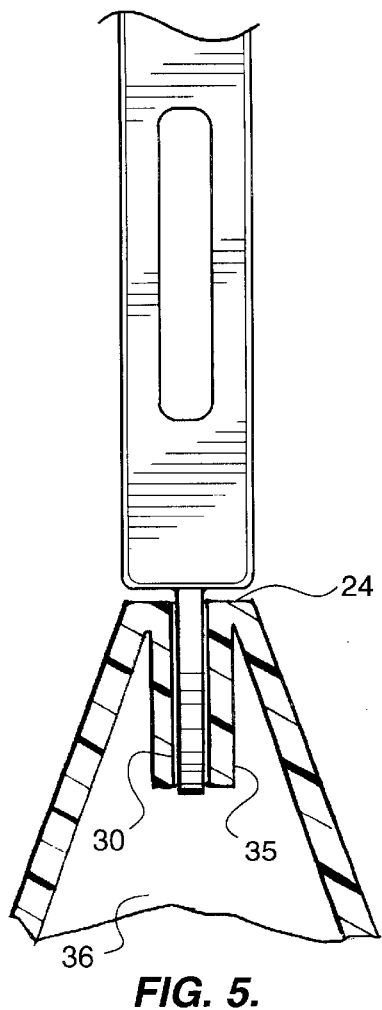
FIG. 5 is a detailed sectional view of the marker of the invention.

Turning to FIGS. 1 to 7, a preferred embodiment of the marker of the present invention is shown and is generally designated by the numeral 10. The marker is a unitary structure having a base 12 which is shown as being generally rectangular having side wall 15. The base 12 supports an upwardly converging body 14 which is shown as having opposite planar sides 16 and 18, rear wall 20 and front wall 22. The side walls, front wall and rear wall converge at upper end 24 which may be a generally planar horizontally disposed surface or may be slightly arcuate. The body 12 as shown is generally in the form of a truncated pyramid but may be other configurations such as a truncated cone or the like as seen in FIG. 8. Preferably the front and rear walls are angularly disposed with respect to the horizontal at an angle of approximately 30 to 45 degrees.

The outer surfaces of walls 20 and 22 may carry appropriate identification indicia 39 such as numerals or letters. Generally the markers are provided in sets with each marker in a set bearing a different number, letter or combination of letters or numbers for convenience of identification. The numeral "1" is shown in FIG. 1 and is representative.

A plurality of receptacles 30, 32 and 34 are provided in the upper surface 24. Receptacle 34 is shown as having a generally arcuate shape. Similarly, depending receptacle 32 is generally circular. Receptacle 30 is shown as an elongate, rectangular opening. As will be explained, the receptacles are intended to temporarily secure or mount warning devices such as flare or flags and may be various shapes in accordance with the shape of the base or stem of the device to be attached. The receptacles 30, 32 and 34 each have a downwardly depending wall 35 which extends into the hollow interior 36 of the base to provide support for the article.

The marker 10 is manufactured from suitable material. It is preferred the marker be manufactured from a suitably durable and environmentally resistant material such as a plastic such as polyvinyl chloride, polystyrene, EVA or polyurethane. The markers are fabricated as integral free-standing units by manufacturing techniques such as injection molding. The markers may be provided in any suitable color or colors, preferably highly visible colors such as those designated "day glow" colors. Reflective material may be provided as described for enhanced or increased visibility. In FIG. 1, a circular patch of reflective material 38 is affixed to wall 22. Indicia 39, such as a numeral or letter, is also applied to a wall surface. For increased strength, ribs 40 may be provided around the structure such as around the interior periphery of the base.

In use, the markers 10 will normally be provided to the user in sets which can be easily stored and stacked in a nested condition as best seen in FIG. 11. When the markers are to be used, such as in connection with sporting activities where field boundaries are to be marked or delineated, the markers are appropriately positioned, as for example at the corners of the playing area. To further provide an indication of the boundaries, a flag such as a flag 50 may be inserted into one of the appropriate receptacles in the top surface of the marker as seen in FIGS. 1 and 2. Flag 50 has a standard which is in the form of a small diameter pole or rod 51 which is insertable within the receptacle 32. Thus, when the flag is inserted into the base, the flag due to its height provides increased visibility and will also provide numerical identification.

The marker according to the present invention may also be used as a traffic warning and safety device. Motorists carrying the markers may position the marker for display in the event of a problem such as a flat tire or mechanical breakdown in order to warn passing motorists and to attract the attention of those who may render assistance such as highway patrol officers. The markers 10 are placed a safe distance in the front and rear of the disabled vehicle. The motorist would be provided a number of the markers 10 in a kit form along with flags such as flag 50 which can be inserted into the receptacles on the top 24 to provide increased visibility.

If the motorist is disabled during periods of darkness or low light, flares may also be inserted into the marker. Flares, preferably nonflammable light sticks such as the type sold under the trademark Cyalume® would be carried by the motorist. These devices are activated by bending them sufficiently so as to intermix the chemical contents resulting in a chemical luminescence. The base of these types of flares carry a stem or projection which generally is either semi-circular or rectangular in cross section and may be inserted as appropriate into one of the receptacles 30 or 34. Once inserted, the flares are maintained in a highly visible, elevated position to serve as cautionary warning to passing motorists.

The marker 10 of the present invention may also be used at a crime scene to mark evidence. The marker is positioned on a horizontal surface adjacent an item such as an item of evidence which may be a shell casing, a blood spot or the like. As indicated above, the markers are provided in sets which are preferably sequentially marked with numerals or letters. The markers may be placed adjacent an evidence item, so the resulting photograph of the marker and evidence item will identify the specific item of evidence. When the investigation at the crime scene is concluded, the investigator may collect the various markers 10 that have been distributed and set about the area and recover them for re-use in subsequent investigations stacking them as seen in FIG. 11. The configuration of the markers make them easily stackable and nestable so they may be conveniently stored for re-use in an evidence kit or in a vehicle storage area.

Figure 4:
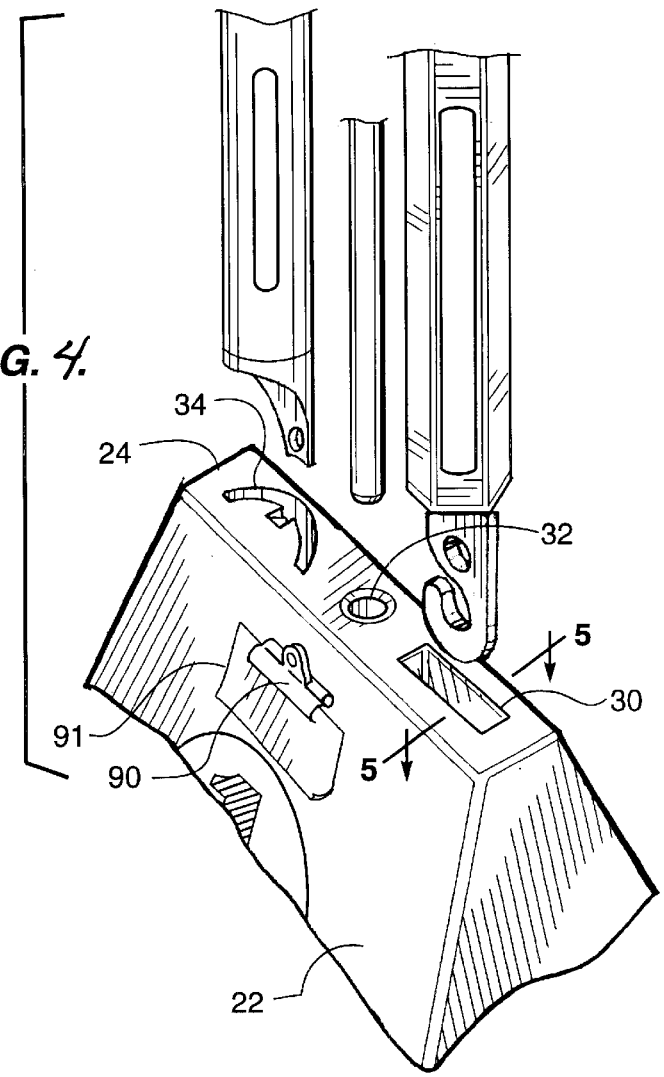
FIG. 4 is a detailed perspective view of the upper end of the marker showing the lower end of a flag and flares.
Figure 6:
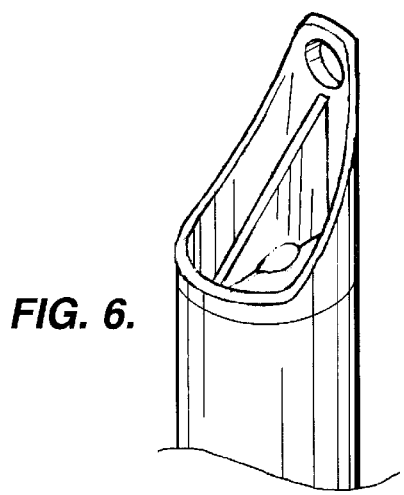
FIGS. 6 and 7 show the lower ends of representative flares that may be supported by the marker.
Figure 7:
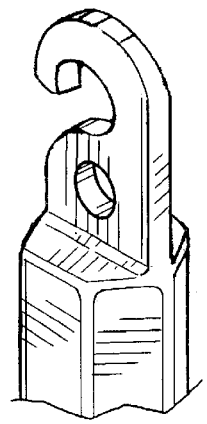

The marker of the present invention may also be modified as shown in FIG. 4 by the inclusion of a clip 90 secured near the top edge of one or both of the surfaces 20 or 22. The clip is a spring clip of conventional design which can be manually opened to accept one or more sheets 91 of writing material. Thus, the clip can be used to position the writing material on the surface and appropriate notes or markings can be placed thereon, for example by an investigating police officer or forensic investigator.

A permanent magnet such as magnet 95 may be incorporated into the base 15 of the marker 10 as seen in FIG. 1. The magnet facilitates placement on a metal surface such as the top or hood of a vehicle for identification purposes if, for example, the marker is used to identify bullet holes in a vehicle.

The marker of the present invention may be used in conjunction with the evidence marker shown in U.S. Pat. No. 5,787,616 as seen in FIGS. 9 and 10 in which it is located next to a shell casing "C". Accordingly, the marker 10 of the present invention is manufactured having dimensions and with the angularity of faces 20 and 22 such that the evidence marker "M" of the '616 patent having an inverted V-shaped, unitary, freestanding configuration can be positioned over the marker 10 of the present invention. In this way, the evidence marker "M", of the type shown in the '616 patent, is additionally secured against displacement or dislodgement due to weather conditions with the marker of the present invention providing anchoring. The evidence marker "M" may be provided with an aperture 62 which allows a flag 50 to be inserted into the marker 10.

It will be obvious to those skilled in the art to make various changes, alterations and modifications to the structure, arrangement, proportion, elements, materials and components used in the practice of the marker of the present invention. To the extent such changes, alterations and modifications do not depart from the spirit and scope of the appended claims. They are intended to be encompassed therein.

We claim:

1. A location marker kit for use as a warning or cautionary device, said marker kit comprising:

(a) a hollow body having a base and a generally upwardly converging wall extending to a top surface, said body being nestable with other marker bodies of the same type and positionable against V-shaped evidence markers;

(b) said top surface defining a plurality of receptacles, each of said receptacle having a different geometric shape;

(c) a flag pole having a flag at an upper end thereof, said flag pole having a lower end with a shape corresponding to the geometric shape of a first one of said receptacles, wherein said flag pole is insertable into said first receptacle to maintain said flag pole in a position extending upwardly from said hollow body; and (d) a flare having a lower end with a shape corresponding to the geometric shape of a second one of said receptacles, wherein said flare is insertable into said second receptacle to maintain said flare in a position extending upwardly from said hollow body.

2. The location marker kit of claim 1 wherein said hollow body includes clip means.

3. The location marker kit of claim 1 wherein said base includes a magnet.

4. The location marker kit of claim 1 wherein said hollow body is generally pyramidal.

5. The location marker kit of claim 1 wherein said hollow body is conical.

6. The location marker kit of claim 1 wherein said hollow body is a high visibility color.

7. The location marker kit of claim 1 further including identifying indicia on said hollow body.

\* \* \* \* \*